(12) United States Patent
Nguyen

(10) Patent No.: US 8,094,737 B2
(45) Date of Patent: Jan. 10, 2012

(54) ADAPTIVE PILOT STRUCTURE TO ASSIST CHANNEL ESTIMATION IN SPREAD SPECTRUM SYSTEMS

(75) Inventor: Phong Nguyen, Victoria (AU)

(73) Assignee: NEC Corporation, Tokyo (JP)

( * ) Notice: Subject to any disclaimer, the term of this patent is extended or adjusted under 35 U.S.C. 154(b) by 959 days.

(21) Appl. No.: 12/064,727

(22) PCT Filed: Aug. 25, 2006

(86) PCT No.: PCT/JP2006/317290
§ 371 (c)(1),
(2), (4) Date: Feb. 25, 2008

(87) PCT Pub. No.: WO2007/024027
PCT Pub. Date: Mar. 1, 2007

(65) Prior Publication Data
US 2009/0279589 A1 Nov. 12, 2009

(30) Foreign Application Priority Data

Aug. 26, 2005 (AU) .................................. 2005904681
Aug. 25, 2006 (AU) .................................. 2006203697

(51) Int. Cl.
*H04K 1/10* (2006.01)
(52) U.S. Cl. ....................................................... 375/260
(58) Field of Classification Search .................... 375/260
See application file for complete search history.

(56) References Cited

U.S. PATENT DOCUMENTS

| 6,654,429 | B1 * | 11/2003 | Li ................................ 375/316 |
| 6,882,618 | B1 * | 4/2005 | Sakoda et al. ................. 370/208 |
| 7,106,700 | B2 * | 9/2006 | Freiberg et al. ............... 370/252 |
| 7,474,611 | B2 * | 1/2009 | Svensson et al. ............. 370/208 |
| 7,646,702 | B2 * | 1/2010 | Sudo ............................. 370/208 |
| 7,751,369 | B2 * | 7/2010 | Kishigami et al. ............ 370/334 |
| 2004/0127213 | A1 * | 7/2004 | Hwang ......................... 455/423 |
| 2006/0146867 | A1 * | 7/2006 | Lee et al. ...................... 370/465 |
| 2006/0209669 | A1 * | 9/2006 | Nishio .......................... 370/208 |
| 2008/0232504 | A1 * | 9/2008 | Ma et al. ....................... 375/267 |
| 2009/0149187 | A1 * | 6/2009 | Miki et al. .................... 455/450 |

FOREIGN PATENT DOCUMENTS

| JP | 2000151548 A | 5/2000 |
| JP | 2001077789 A | 3/2001 |
| JP | 2003158499 A | 5/2003 |
| WO | 2004056022 A2 | 7/2004 |
| WO | WO 2004056022 A2 * | 7/2004 |
| WO | WO2005020488 A1 | 3/2005 |
| WO | 2006109439 A1 | 10/2006 |

OTHER PUBLICATIONS

Classen, "Channel estimation units for an OFDM system suitable for mobile communication", in ITG Conference on Mobile Radio, Neu-Ulm, Germany, Sep. 1995.*

(Continued)

*Primary Examiner* — Juan A Torres

(57) ABSTRACT

The present invention relates generally to methods for generating a dynamic pilot symbol structure in spread spectrum communication systems, and in particular to the use of pilot symbols by user equipment in channel estimation. In one form, the method includes, allocating basic pilot symbols (402) at the beginning of each data chunk (404, 406) and spread over the plurality of sub-carrier frequencies; and selectively replacing data symbols (408) in each data chunk (400) with adaptive pilot symbols (410) according to the speed of the user equipment.

16 Claims, 5 Drawing Sheets

OTHER PUBLICATIONS

Hoeher, "Pilot-symbol-aided channel estimation in time and frequency, Multi-carrier Spread-Spectrum," Kluwer Academic Publishers, 1997.*

Garcia, "Efficient pilot patterns for channel estimation in OFDM systems over HF channels," Proc IEEE VTC 1999.*

International Search Report for PCT Application No. PCT/JP2006/317290 mailed Nov. 28, 2006.

Satoshi Nagata et al., "Effect of Frequency-domain Packet Scheduling in Forward Link Spread OFDM Broadband Packet Wireless Access", Technical Report of IEICE, Nov. 12, 2004, vol. 104, No. 440, pp. 31-36.

* cited by examiner

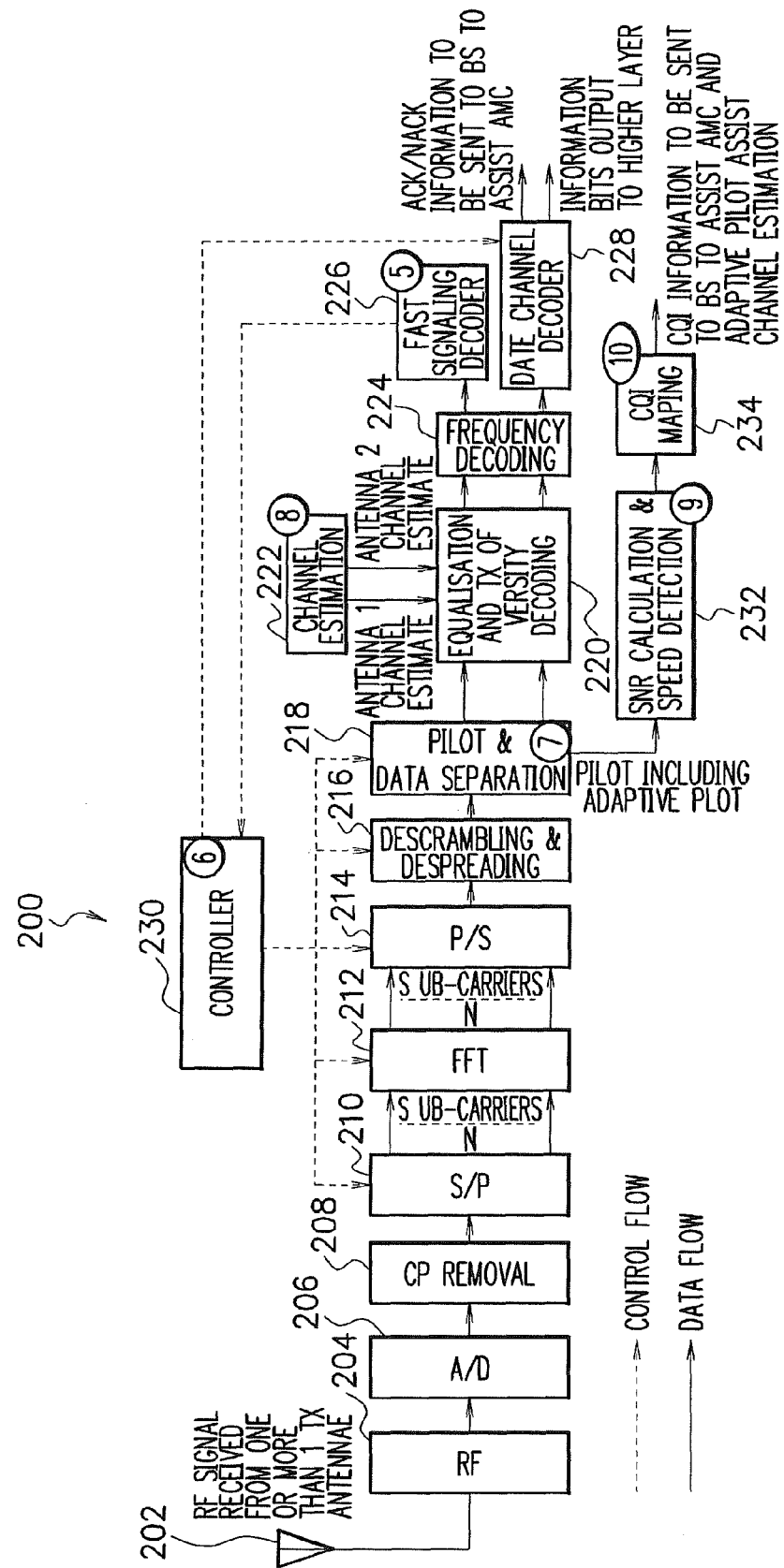

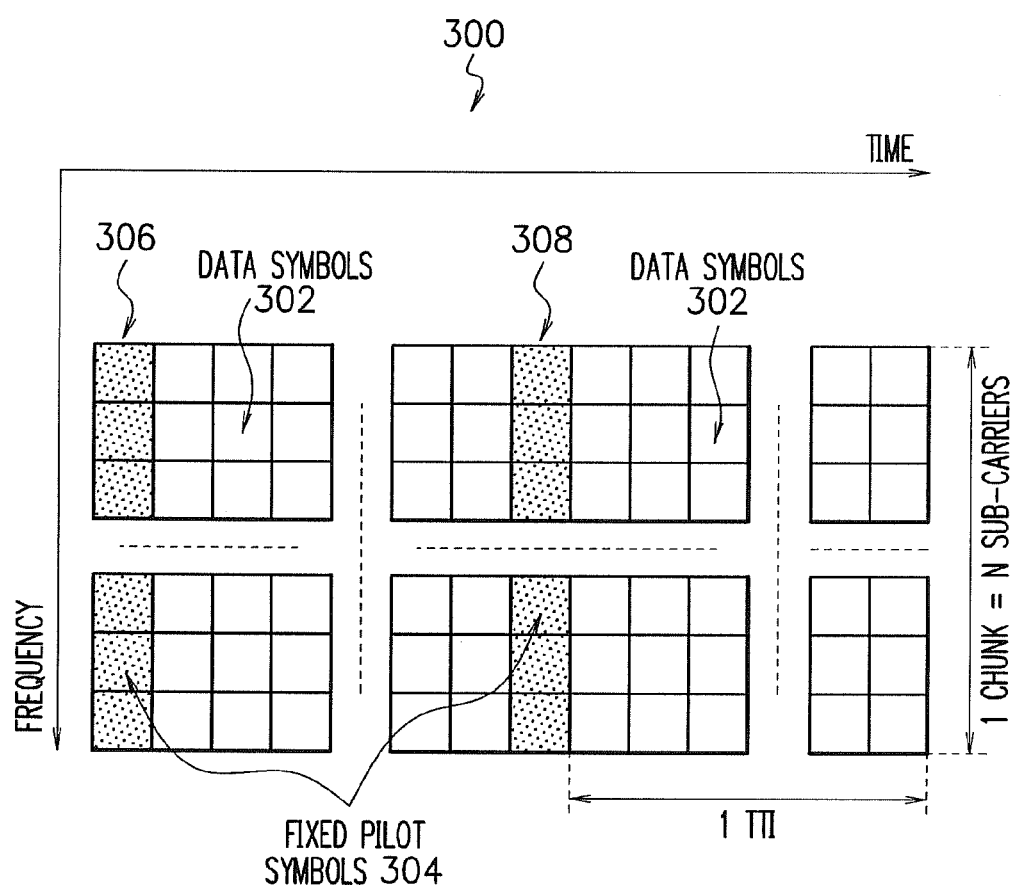

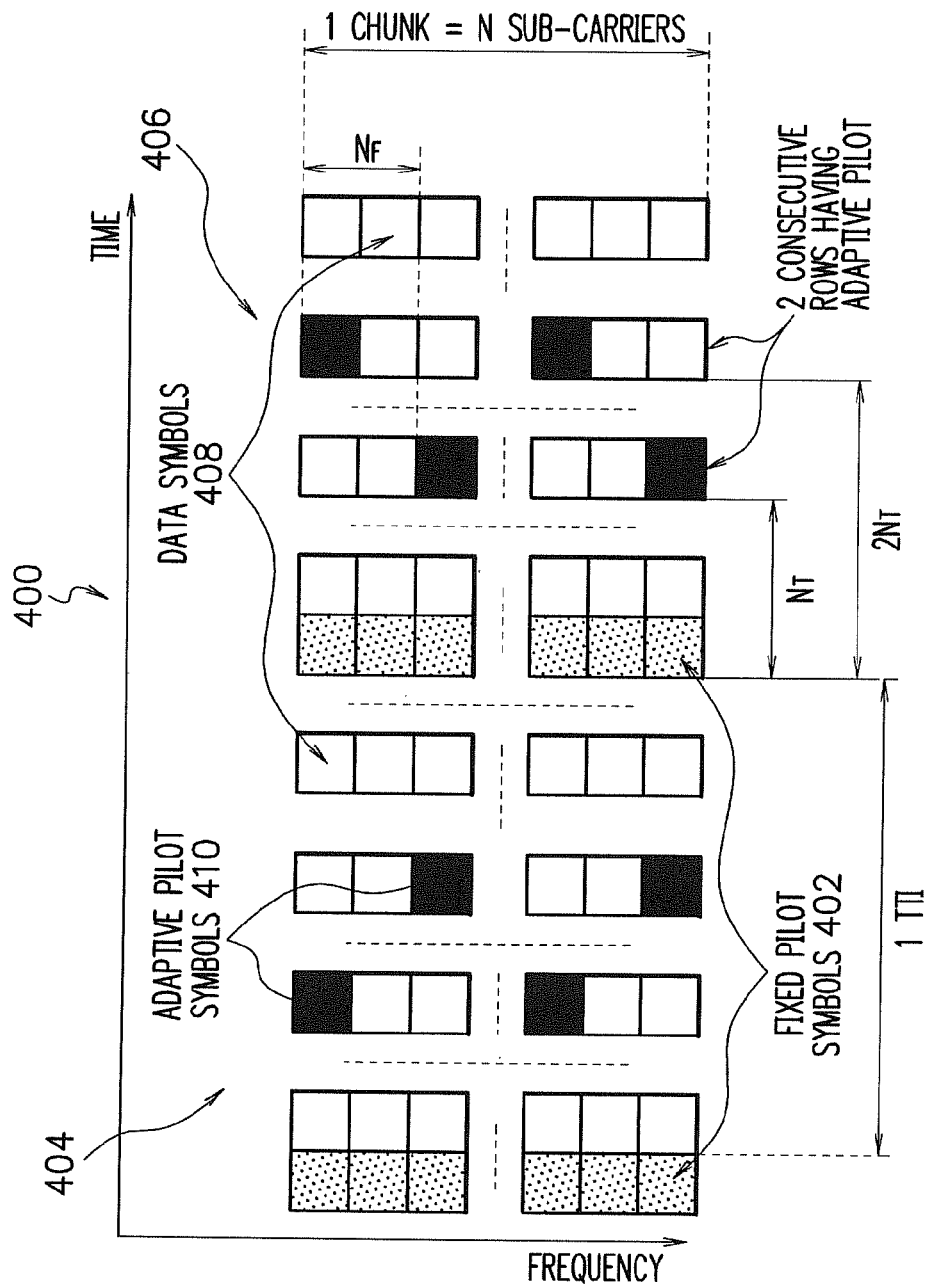

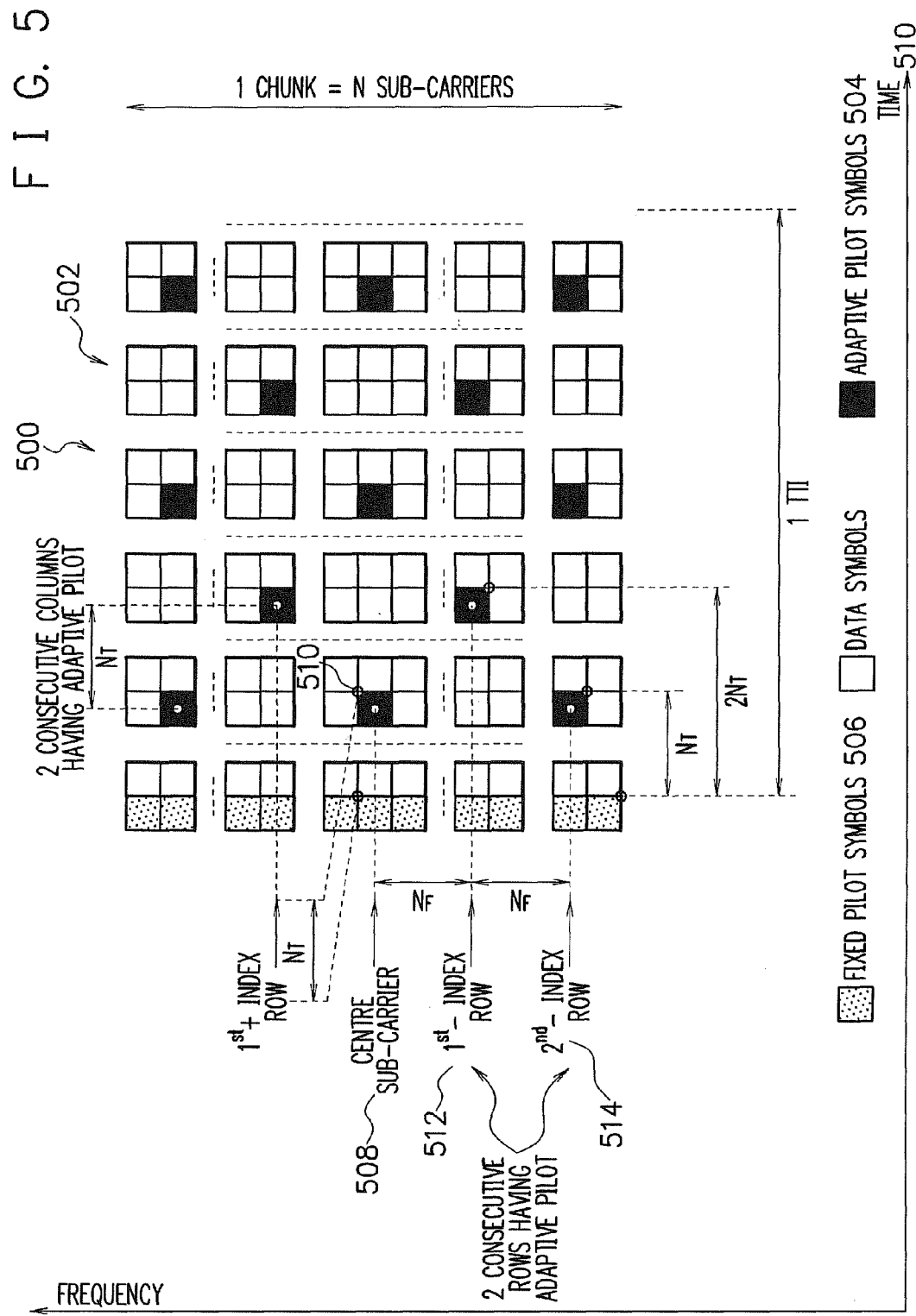

ADAPTIVE PILOT STRUCTURE TO ASSIST CHANNEL ESTIMATION IN SPREAD SPECTRUM SYSTEMS

BACKGROUND OF THE INVENTION

The present invention relates generally to methods for generating a dynamic pilot symbol structure in spread spectrum communication systems, and in particular to the use of pilot symbols by user equipment in channel estimation. The invention is suitable for use in spread spectrum communication systems using Orthogonal Frequency Division Multiplexing (OFDM) modulation techniques for high speed data communication, such as the proposed long term evolution (LTE) known as super 3G (S3G) system currently being developed by the Third Generation Partnership Project (3GPP) and it will be convenient to describe the invention in relation to that exemplary, but non-limiting, application.

Recent enhancements on packet transmission such as High Speed Downlink Packet Access (HSDPA) and enhanced uplink packet transmission technology such as high speed uplink packet access (HSUPA) have made 3GPP radio-access technology highly competitive. In order to ensure that the competitiveness of this technology continues over a long time frame, a long term evolution (LTE) of 3GPP radio-access technology is being developed. This new technology is known as Super 3G. Important parts of the long term evolution of Super 3G technology includes Radio Access Network (RAN) latency reduction, higher user data rates, improving system capability and coverage, and reducing cost to a network operator. In order to achieve this, an evolution of the radio interface as well as the radio network architecture is being considered. The objective of this evolution is to develop a framework to enable high data rate, low latency and a packet-optimised radio-access technology.

The Super 3G system currently being developed is intended to boost the existing 3G data rate by 10 times, with the target data rate for downlink direction being 100 Mbps and for the uplink direction being 50 Mbps on the 20 MHz transmission bandwidth. The services introduced in Super 3G systems shall be similar to the existing 3G High Speed Downlink Packet Access (HSDPA), Multimedia Broadcast-Multicast Services (MBMS), and High Speed Uplink Packet Access (HSUPA) but with much higher data rate.

In order to achieve such high data rates, a new radio access technology, known as Orthogonal Frequency Division Multiplexing (OFDM) has been introduced together with higher modulation (64-QAM) and coding scheme e.g. turbo or LDPC (low density parity check) coding as well as other features such as Multiple Input Multiple Output (MIMO). The OFDM technology shall provide radio access which allows parallel transmission of data symbols on orthogonal sub-carrier frequencies.

OFDM is a modulation technique that can be used for high speed data communication. OFDM technology for Super 3G is considered to have the following advantages:

high spectral efficiency can be obtained by specific selection of the sub-carrier frequencies by defining the frequency spacing between sub-carriers to be equal to the reciprocal of the OFDM symbol duration.

power efficiency as there no crowding in the signal space robust to multi-path interference can be obtained by introducing a guard interval between consecutive OFDM symbols in the time domain, and robust to narrow band interference.

However, OFDM technology is quite sensitive to impairment such as phase noise, carrier frequency offset, in-phase/quadrature imbalance, phase distortion and linearity issues. These issues always exist in implementation and are computationally complex and expensive to remove. These issues introduce inter-carrier interference, reduce Signal to Interference and Noise Ratio (SINR) and create intermodulation difficulties which contribute to a noise-like cloud surrounding each constellation point. These identified impairments in turn affect the possibility of applying high level modulation schemes and coding schemes, therefore making the target data rate more difficult to achieve.

Accurate channel estimation by user equipment in OFDM technology is also difficult to achieve. Studies have been conducted on appropriate pilot patterns to assist in channel estimation by user equipment, however to date no pilot pattern has been developed which is well suited to the needs of future Super 3G system requirements including wide range of User Equipment (UE) mobility with maximum speed up to 350 km/h.

SUMMARY OF THE INVENTION

With that in mind, one aspect of the present invention provides a method for a generating pilot symbol structure in a spread spectrum communications system, wherein data is transmitted between a base station and user equipment in the spread spectrum communications system in data chunks in which data symbols are transmitted in parallel on a plurality of sub-carrier frequencies and at regular temporal positions during a transmission time interval, the method including the steps of:

allocating basic pilot symbols at the beginning of each data chunk and spread over the plurality of the sub-carrier frequencies; and selectively replacing data symbols in each data chunk with adaptive pilot symbols according to the speed of the user equipment.

An adaptive pilot symbol generation method of certain embodiments of the first aspect of the invention may assist User Equipment (UE) channel estimation in conditions where the UE is moving and the UE channel estimation is poor due to lack of pilot symbols used by the UE to track the fading channel. It may also help avoid the transmission of unnecessary pilot overhead as has been proposed in recent studies in order to obtain good quality channel estimation. Furthermore, in some embodiments an embodiment of the method may be backwardly compatible with existing High Speed Packet Access (HSDPA) procedures on existing Wideband Code Division Multiple Access (WCDMA) systems on which enhanced HSDPA shall be developed for the future Super 3G system.

Preferably, the adaptive pilot symbols are evenly distributed in the data chunk in the time domain.

The adaptive pilot symbols may also be evenly distributed in the data chunk in the frequency domain.

The step of selectively replacing data symbols with adaptive pilot symbols may include:

at a central sub-carrier frequency of the data chunk, inserting the adaptive pilot symbols along the time domain separated by a temporal distance $2 \times N_T$ where:

$$N_T = \left\lfloor \frac{1}{2 \cdot f_D \cdot T_{sym}} \right\rfloor \text{ where } \lfloor \rfloor \text{ is a round down to the nearest integer}$$

and where $f_D$ is the Doppler frequency measured at the user equipment in Hz, and where $T_{sym}$ is the data symbol duration in seconds.

The first adaptive pilot symbol may be inserted at the central sub-carrier frequency at a temporal distance of $N_T$ from the basic pilot symbols.

The step of selectively replacing data symbols with adaptive pilot symbols may further include:

inserting the adaptive pilot symbols at sub-carrier frequencies spaced from each other by a frequency spacing $N_F$ where:

$$N_F = \left\lfloor \frac{1}{2 \cdot \Delta f \cdot \tau_{max}} \right\rfloor \text{ where } \lfloor \rfloor \text{ is a round down to the nearest integer}$$

where $\Delta f$ is the sub-carrier bandwidth in Hz, and
where $\tau_{max}$ is the maximum delay spread in seconds.

The cyclic prefix length may be used to for $\tau_{max}$.

The adaptive pilot symbols inserted in consecutive sub-carrier frequencies may be temporally offset by the temporal distance $N_F$. The method may further include the step of performing data symbol puncturing or reducing data symbol repetition prior to insertion of the adaptive pilot symbols.

The method of generating pilot symbols may further include the step of:

generating pilot symbol information identifying the location of the adaptive pilot symbols in the data chunk to enable the user equipment to use the adaptive pilot symbols for channel estimation.

The pilot symbol information may be encoded to reduce the number of bits transmitted to the user equipment.

Preferably, the adaptive pilot symbol information is self decodable by the user equipment.

The pilot symbol information may be transmitted prior to transmission of the pilot symbols and data chunks to enable detection of the adaptive pilot symbols by the user equipment.

The number $N_{ADAPTIVE\_PILOT\_SYM}$ of adaptive pilots to be inserted within a data chunk may be determined from the expression $$N_{ADAPTIVE\_PILOT\_SYM} = \left\lceil \frac{1}{2} \times \left\lceil \frac{N_{subcarrier\,per\,chunk}}{N_F} \right\rceil \times \left\lfloor \frac{N_{symbols\,per\,TTI\,per\,subcarrier}}{N_T} \right\rfloor \right\rceil$$

If $N_T$ is greater than number of symbol per Transmission Time Interval (TTI) on a single carrier, then adaptive pilot symbols is preferably not required to be inserted.

The data chunks may be transmitted from the base station to the user equipment using orthogonal frequency division multiplexing.

The spread spectrum communications system may conform to LTE/Super 3G system standards developed by the Third Generation Partnership Project (3GPP).

Another aspect of the invention provides a base station forming part of a spread spectrum communications system, the base station including one or more processing blocks for carrying out a method according to any one of the preceding claims.

The one or more processing blocks may be implemented using digital signal processing techniques.

BRIEF DESCRIPTION OF THE DRAWINGS

The present invention will now be described with reference to the attached drawings in which the method of generating pilot symbols is illustrated in a preferred embodiment. It is to be appreciated however, that the method of generating pilot symbols, and the base station and user equipment forming part of a spread spectrum communications system in which the method is enabled, are not limited to the exemplary embodiments illustrated in the drawings.

In the drawings:

FIG. 2 is a schematic diagram of user equipment adapted for communication with the base station shown in FIG. 1;

FIG. 3 is a schematic diagram illustrating the use of basic pilot symbols in the data structure used by the base station and user equipment shown in FIGS. 1 and 2;

FIG. 4 is a schematic diagram showing the use of adaptive pilot symbols and basic pilot symbols in the data structure used for communication between the base station and user equipment of FIGS. 1 and 2; and FIG. 5 is a schematic diagram illustrating the positioning of distribution of the adaptive pilot symbols shown in FIG. 4 in a scatter format in both the time and frequency domain throughout a data chunk transmitted between the base station and user equipment shown in FIGS. 1 and 2.

DETAILED DESCRIPTION OF THE INVENTION

Figure 1:
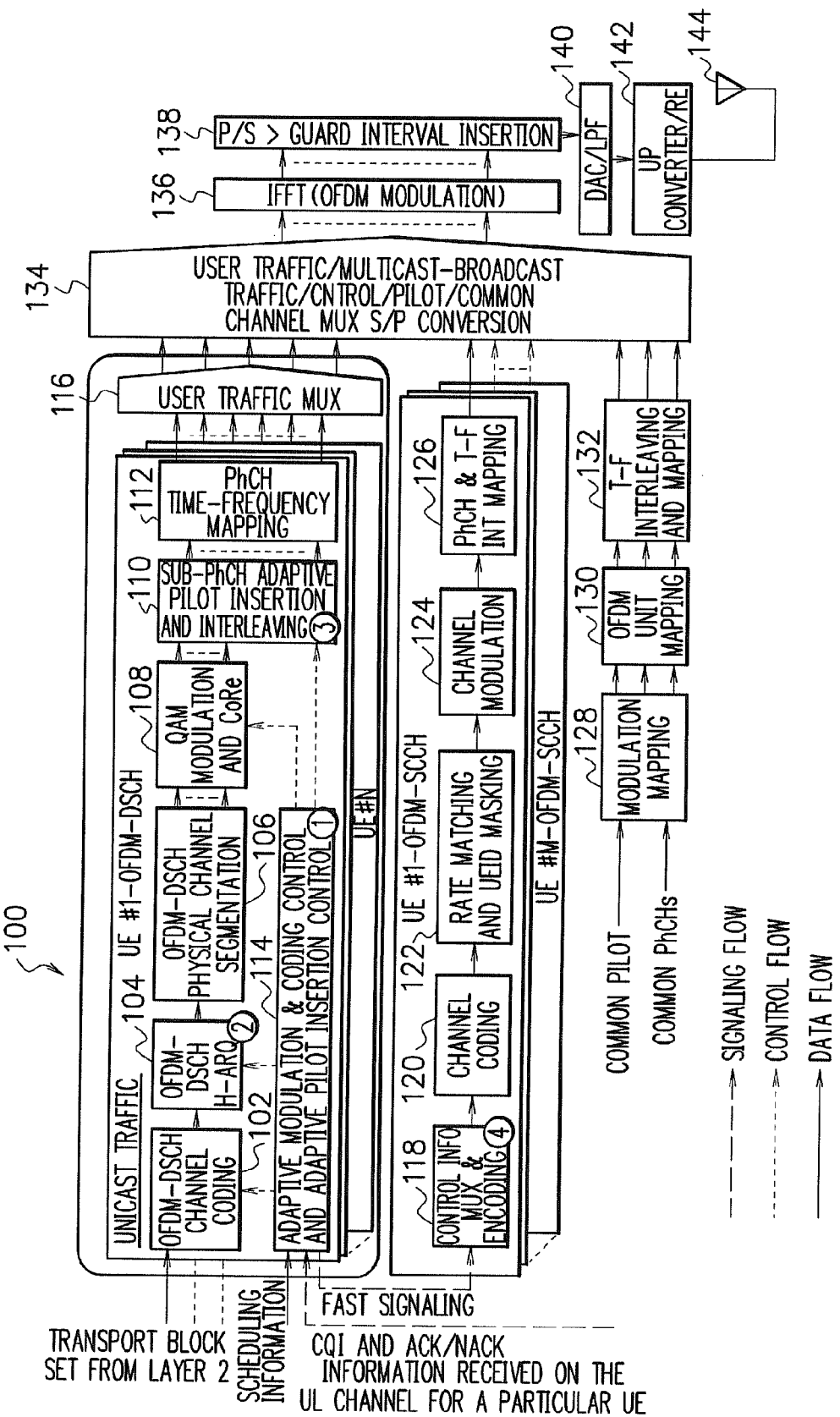
FIG. 1 is a schematic diagram illustrating the operation of a base station forming part of a spread spectrum communications system in which data is modulated using OFDM modulation techniques.

Referring now to FIG. 1, there is shown generally a base station 100 forming part of a Super 3G communication system in which Orthogonal Frequency Division Multiplexing (OFDM) modulation techniques are used. The base station 100 includes a series of data processing blocks 102 for carrying out the required functionality of the base station. In a preferred embodiment of the invention, the processing blocks 102 to 140 are implemented using digital signal processing techniques, although in other embodiments of the invention any desirable combination of hardware and software may be used.

In reference to FIG. 1, the base station 100 comprises:

Processing block 102 which is responsible for performing forward error detection and error correction coding. The coding rate for the forward error correction is control by the "adaptive coding and modulation control" processing block 114 depend on channel quality information reported by UE;

The encoded data block output from 102 is then subjected to Layer 1H-ARQ processing block 104 in which selective version of the encoded data block shall be transmitted to gain the effectiveness of physical layer Hybrid Automatic Retransmission Request (H-ARQ). This processing block 104 is also under the control of the "adaptive coding and modulation control" processing block 114 which provides information on data transmission version to be processed. This processing block 104 also perform additional puncturing or reducing repetition of data bit(s) to leave room for adaptive pilot insertion during the functional processing 110 according to the control information from 114.

The data block output from the processing block 104 is then segmented and mapped to different OFDM physical channel unit (T-F chunk) by the processing block 106. Data for each chunk unit is then being modulated independently by the processing block 108 according to channel condition of each of the frequencies chunk to gain the effectiveness of frequency selective fading. At the processing block 110, the adaptive pilot symbols shall be inserted according to the pre-calculated pattern given by the 114. The modulated data symbols block with adaptive pilot insertion is then mapped to OFDM physical channel by the processing block 112 to be ready for being multiplexed with other UE data for simultaneous transmission from a base station. The modulated data unit for each UE is then multiplexed by the processing block 116 according to frequency and time schedule.

For each UE, prior to the transmission of the modulated data block output from the 116 on shared data channel, the control information associated with that modulated data block shall be multiplexed and encoded by 118, forward error detection and correction encoding 120, physical channel rate matching and UE ID masking 122 for the purpose of self detection at an UE, physical channel modulation using QPSK 124 and then mapped to OFDM physical channel unit by 126 to be sent on physical shared control channel. The control information associating with a transmitted data packet includes transport block size, redundancy version; H-ARQ process, modulation scheme for each chunk unit, adaptive pilot information for each shared data chunk unit and frequency scheduling information necessary for a UE which detects intended control information shall be able to perform the reception and decoding of the transmitted packet.

Along with the transmission of shared control channel(s) and associated shared data channel, there are also other channels including common pilot channel and other common PhCHs necessary for UE operation which is channel modulated 128, interleaved and OFDM physical channel mapping by 130 and 132 respectively.

All modulated channel shall be spreaded, then time multiplexed in a pre-scheduled manner, and cell specific scrambled at 134 before being OFDM modulated at processing block 136. Each OFDM modulated symbol is then added a Guard interval (138) which also called Cyclic Prefix (CP) for the purpose of combating multipath delay. The digital signal is the subjected to Digital to Analog conversion and Low pass filter 140, up converted to carrier frequency and other RF processing 142 and then transmitted over antenna 144.

FIG. 2 shows generally a schematic diagram of user equipment 200 for receiving and processing information transmitted by the base station 100.

At a S3G UE site, RF signal is received via antenna 202, RF processing by 204, then Analog to Digital conversion at 206. With OFDM symbol timing provided by cell searcher and path searcher, the CP removal processing block 208 shall remove the guard interval inserted for each OFDM at 138 (FIG. 1). The received modulated OFDM symbol is then OFDM demodulated at 210, 212 and 214 by applying Discrete Fourier Transport (DFT) techniques. The received data samples are the de-scrambled 216 using cell specific scrambling code detected by cell searcher, the de-scrambled data samples are then Despreaded 216 to retrieve data symbols. The retrieved data symbols shall be separated from pilot symbols this also includes adaptive pilot symbol if the shared data channel chunk is processed at 218. The pilot symbols are then used for channel estimation (222). The channel estimate shall be done also for the case of Transmit diversity. In TX diversity case the channel estimate shall be done for each TX antenna. This is also used for signal to noise ratio (SNR) calculation and UE speed detection 232.

With the fading vectors calculated by the channel estimation (222), the data symbols shall be equalised and TX diversity decoding at (220), frequency decoding at (224) which performs data symbol shifting to reverse the coding process that is done at transmitter site to gain space-time-frequency diversity when TX diversity is used if it is required.

Initially, only data symbols on shared control channel are monitored and received. If the intended control information is detected then the fast signalling shall be decoded at (226) with the decoded information including associated shared data channel's transport block size information, redundancy version, frequency schedule information, modulation scheme, H-ARQ process, adaptive pilot information, to be provided to 230 to configure 210, 212, 214, 216 and 218 to receive the associated shared data channel.

Once being configured, the layer 1 UE shall perform shared data channel reception in the same process as being described above according to assigned channel information. The frequency decoded shared data channel symbols are further decoded by 228. This includes physical channel demodulation (QPSK/QAM) independent for each physical chunk, de-interleaving, rate-de-matching and soft combine of the Layer 1 H-ARQ, channel decoding and error checking on the final received transport block. The error check result is then sent to Base Transceiver Station (BTS) as feedback information for retransmission version or new transmission packet if it is required.

The SNR calculated and speed detected from 232 is then used for determining if adaptive pilot symbols for each shared data channel chunk is required. This information is then mapped to Channel Quality Indicator (CQI) which shall be sent back to BTS as feedback information for Adaptive Modulation and Coding (AMC) and adaptive pilot symbols control.

The expected maximum speed of user equipment 200 is considered to be an important parameter in determining the minimum coherent time, and the expected maximum excess delay which determines the minimum coherent bandwidth of information transmitted between the base station 100 and user equipment 200. Pilot symbols transmitted from the base station 100 to the user equipment 200 must be placed close enough together in order for the user equipment to track the time and frequency variations of the transfer function, but on the other hand must be far enough apart to avoid system degradation from unnecessary pilot overhead. According to the 3GPP LTE/Super 3G requirements, a maximum of 350 km/h is required by Super 3G user equipment. This requirement imposes significant overhead due to pilot symbols if a traditional pilot pattern design for OFDM systems is applied to Super 3G systems.

Furthermore, existing applications using HSDPA technology is applicable for low speed user equipment, and therefore traditional pilot patterns or structures based on maximum speed for OFDM systems are not efficient in the short term.

FIG. 3 shows a schematic diagram of a pilot symbol and data structure 300 in which additional pilot symbols are inserted within a Super 3G standard data chunk unit in order to assist channel estimation at user equipment. The additional pilot symbols are inserted at the base station 100 according to the "channel quality information" measured and reported back to the base station 100 from user equipment 200. As shown in this figure, the concept of adaptive pilot symbol assisted channel estimation includes two principle parts. In the first part, data symbols 302 are arranged data chunks in which data symbols are transmitted in parallel on a number sub-carrier frequencies and at regular temporal positions during transmission of the data chunk. In the schematic shown in FIG. 3, N sub-carrier frequencies are represented.

The time interval between the start and end of transmission of each data chunk is known as the Transmission Time Interval (TTI) and the data symbols are transmitted in parallel on the N sub-carriers at regular temporal positions during each transmission time interval.

Basic pilot symbols are allocated at the beginning of each data chunk. The basic pilot symbol-data symbol structure is fixed and the same for all channels. The structure consists of pilot symbols for all transmission antennae (depending on whether transmit diversity or MIMO is used). The pilot symbols are allocated at the beginning of a chunk of data and are spread over all sub-carrier frequencies. The fixed pilot symbols are referenced 304 in FIG. 3 and are arranged in basic pilot symbol blocks 306 and 308 across the N sub-carrier frequencies shown in FIG. 3.

Allocation of the basic pilot symbols as shown in FIG. 3 assists in preventing the loss of channel estimation accuracy due to the effect of narrowing down the coherent bandwidth of the channel because the pilot symbols are dense and evenly distributed along the frequency domain. For stationary or low speed user equipment this structure is best suited as there is no variation in the time domain and channel estimates of other positions within a data chunk can be derived using linear interpolation in the time domain only.

In the pilot-data structure 400 shown in FIG. 4, fixed pilot symbols 402 are allocated at the beginning of data chunks 404 and 406. Each of the data chunks 404 and 406 includes data symbols referenced 402 includes data symbols referenced 408 in this figure. In addition to the allocation of the basic fixed pilot symbols 402 however, adaptive pilot symbols 410 selectively replace data symbols in each data chunk 404 and 406 according to the speed of the user equipment. As the speed of the user equipment 100 increases, certain data symbols in the time domain are replaced by the adaptive pilot symbols 410 to provide reference information for channel estimation in order to combat the variation caused by the Doppler effect The pilot symbol-data structure 500 shown in FIG. 5 more clearly illustrates the positioning of the basic fixed pilot symbols and the adaptive pilot symbols in the special and frequency domain within a single data chunk 502. As can be seen in this figure, the adaptive pilot symbols 504 are evenly distributed in the data chunk 502 in the time domain and also in the frequency domain. Basic pilot symbols 506 are allocated at the beginning of the data chunk 502. Starting at a central sub-carrier frequency 508 of the data chunk 502, adaptive pilot symbols 504 are inserted along the time domain 510 separated by a temporal distance of $2 \times N_T$ where $$N_T = \left\lfloor \frac{1}{2 \cdot f_D \cdot T_{sym}} \right\rfloor \text{ where } \lfloor \rfloor \text{ is a round down to the nearest integer}$$

where $f_D$ is the Doppler frequency measured at the user equipment in Hz, and
$T_{sym}$ is the data symbol duration in seconds.

The first of the adaptive pilot symbols 504, referenced 510 is inserted at the central sub-carrier frequency 508 at a temporal distance $N_T$ from the basic pilot symbols 506.

Accordingly, $N_T$ is the temporal distance between two consecutive columns of data symbols in the data chunk 502 in which adaptive pilot symbols are inserted.

It can also be seen from FIG. 5 that the adaptive pilot symbols are inserted at sub-carrier frequencies spaced from each other by a frequency spacing $N_F$ where:

$$N_F = \left\lfloor \frac{1}{2 \cdot \Delta f \cdot \tau_{max}} \right\rfloor \text{ where } \lfloor \rfloor \text{ is a round down to the nearest integer}$$

where $\Delta f$ is the sub-carrier bandwidth in Hz, and
where $\tau_{max}$ is the maximum delay spread in seconds.

The cyclic prefix length may be used to for $\tau_{max}$.

In order to optimise the even distribution of the adaptive pilot symbols 504 inserted in the data chunk 502, adaptive pilot symbols 504 inserted in consecutive sub-carrier frequencies are temporally offset by the temporal distance $N_F$. This can be best seen by considering first index row 512 and second index row 514 referencing consecutive sub-carrier frequencies into which adaptive pilot symbols have been inserted. It can be seen that the pilot symbols inserted into first index row 512 and second index row 514 are temporally offset by the distance $N_F$.

The adaptive pilot symbols are inserted into the data chunk 502 in order to assist channel estimation in user equipment 200 as follows: Firstly, the base station 100 instructs the user equipment 200 to perform Channel Quality information (CQI) measurement via a Signal to Noise Ratio (SNR) calculation performed by the SNR calculation and speed detection block 232 shown in FIG. 2. The SNR calculation is based on the fixed pilot pattern structure comprising the fixed pilot pattern symbols 506 shown in FIG. 5. Regardless of the measured speed of the user equipment 200, these fixed pilot symbols 506 are always allocated at the beginning of each data chunk 502. Furthermore, the user equipment 200 performs a Doppler spread estimation calculation in the SNR calculation and speed detection block 232.

The two measurements of SNR and Doppler spread are then mapped by the CQI mapping block 234 to a predetermined Channel Quality Indicator (CQI) index which is self decodable by the base station 100. The CQI index is sent on an uplink channel that is scheduled for the user equipment 200.

Referring again to FIG. 1, upon reception of the CQI index value from the user equipment 200, the base station 100 decodes the CQI index value and then, in the adaptive modulation and coding control and adaptive pilot insertion control block 114, determines if adaptive pilot symbol insertion is required (namely, whether the value of $N_T$ is greater than the Transmission Time Interval (TTI). If adaptive pilot symbol insertion is required, then the base station 100 performs a calculation to determine how many adaptive pilot symbols are required to be inserted.

The number of adaptive pilot symbols for each chunk unit can be calculated using the below formula. This expression shall provide total number of adaptive pilot symbols to be inserted into a chunk according to the fashion described above.

$$N_{ADAPTIVE\_PILOY\_SYM} = \left\lceil \frac{1}{2} \times \left\lceil \frac{N_{subcarrier\,per\,chunk}}{N_F} \right\rceil \times \left\lfloor \frac{N_{symbols\,per\,TTI\,per\,subcarrier}}{N_T} \right\rfloor \right\rceil$$

where $\lceil \; \rceil$: is a Mean round up to the nearest integer, and
where $\lfloor \; \rfloor$: Mean round down to the nearest integer.

If $N_T$ is greater than Number of symbols per TTI on one sub-carrier, then the adaptive pilot insertion is not needed as the pilot common symbols associated the data chunk is enough for channel estimation (i.e channel fading does not vary within TTI in time domain). Further more if $N_T$ is greater than Number of symbols per TTI on one sub-carrier, the basic pilot from the consecutive chunk in time domain can be also be used to assist channel estimation on the current chunk of data symbol.

When the number of adaptive pilot symbols required to be inserted per data chunk has been calculated, the adaptive modulation and control coding and adaptive pilot insertion control block 114 instructs the OFDM-DSCH Hybrid Automatic Repeat Request (H-ARQ) block 104 to perform extra puncturing, or alternatively a reduction in the repetition of data symbols, in the data chunk 502 in order to leave room for the insertion of additional adaptive pilot symbols 504.

The Sub-Physical Channels (PhCH) adaptive pilot insertion and interleaving block 110, the adaptive pilot symbols 504 are inserted at the desired positions in the data chunk 502 as described previously. It should be noted that puncturing and then dummy bit insertion can also be performed in the block 104 so that simply overwriting of the data symbols at the desired positions by adaptive pilot symbols can occur in the Sub-PhCH adaptive pilot insertion and interleaving bock 110.

Along with processing of the data packet for transmission to user equipment 200, the base station 100 also processes fast signalling information which includes information on the location of adaptive pilot symbols within the data chunk 502 so that the user equipment 200 can allocate and utilise the adaptive pilot symbols for channel estimation. The information for the user equipment 200 to identify the position of the adaptive pilot symbol pattern within a data chunk 502 is encoded to reduce the number of information bits required to be transmitted over the air interface between the base station 100 and user equipment 200. The fast signalling is transmitted on the Shared Control Channel (SCCH) prior to the transmission of the pilot symbols and data chunks to enable detection of the adaptive pilot symbols by the user equipment.

In the user equipment 200, the user equipment monitors for control information intended for it, and upon the detection of such control information, performs the fast channel signal decoding in the fast signal decoder block 226 to retrieve information for performing reception and decoding of the associated shared data channel including information identifying the location of the adaptive pilot symbols in the data chunk 502.

The information relating to the insertion of the adaptive pilot symbols is then used by the controller 230 to control the pilot and data separation carried out by the pilot and data separation block 218. The adaptive pilot symbols are accordingly extracted for use in enhancing the channel estimation carried out by the channel estimation block 222 to improve the data channel equalisation performed by the equalisation and transmit diversity decoding block 220.

Finally, it is to be appreciated that various modifications and additions may be made to the above described method of generating pilot symbols in spread spectrum communication system, and base station and user equipment for carrying out such method, without departing from the spirit or ambit of the invention.

The invention claimed is:

1. A method of generating a pilot symbol in a spread spectrum communication systems, wherein data is transmitted between a base station and user equipment in the spread spectrum communication system in data chunks in which data symbols are transmitted in parallel on a plurality of sub-carrier frequencies and at regular temporal positions during a transmission time interval, the method including the steps of:
   allocating basic pilot symbols at the beginning of each data chunk and spread over the plurality of sub-carrier frequencies; and
   selectively replacing data symbols in each data chunk with adaptive pilot symbols according to the speed of the user equipment,
   wherein the adaptive pilot symbols are evenly distributed in the data chunk in the time domain.

2. The method according to claim 1, wherein the adaptive pilot symbols are evenly distributed in the data chunk in the frequency domain.

3. The method according to claim 1, wherein the step of selectively replacing data symbols with adaptive pilot symbols includes:
   at a central sub-carrier frequency of the data chunk, inserting the adaptive pilot symbols along the time domain separated by a temporal distance $2 \times N_T$ where:

$$N_T = \left\lfloor \frac{1}{2 \cdot f_D \cdot T_{sym}} \right\rfloor \text{ where } \lfloor \rfloor \text{ is a round down to the nearest integer}$$

where $f_D$ is the Doppler frequency measured at the user equipment in Hz, and
where $T_{sym}$ is the data symbol duration in seconds.

4. The method according to claim 3, wherein a first adaptive pilot symbol is inserted at the central sub-carrier frequency at a temporal distance of $N_T$ from the basic pilot symbols.

5. The method according to claim 3, wherein the step of selectively replacing data symbols with adaptive pilot symbols further includes inserting the adaptive pilot symbols at subcarrier frequencies spaced from each other by a frequency spacing $N_F$ where:

$$N_F = \left\lfloor \frac{1}{2 \cdot \Delta f \cdot \tau_{max}} \right\rfloor \text{ where } \lfloor \rfloor \text{ is a round down to the nearest integer}$$

where $\Delta f$ is the sub-carrier bandwidth in Hz, and
where $\tau_{max}$ is the maximum delay spread in seconds.

6. The method according to claim 5, wherein $\tau_{max}$ is a cyclic prefix length.

7. The method according to claim 5, wherein adaptive pilot symbols inserted in consecutive sub-carrier frequencies are temporally offset by the temporal distance $N_F$.

8. The method according to claim 3, and further including the step of:
   performing data symbol puncturing or reducing data symbol repetition prior to insertion of the adaptive pilot symbols.

9. The method according to claim 3, wherein a number $N_{ADAPTIVE\_PILOT\_SYM}$ of adaptive pilot symbols to be inserted within a data chunk is determined from the expression $$N_{ADAPTIVE\_PILOT\_SYM} = \left\lfloor \frac{1}{2} \times \left\lceil \frac{N_{subcarrier\,per\,chunk}}{N_F} \right\rceil \times \left\lfloor \frac{N_{symbols\,per\,TTI\,per\,subcarrier}}{N_T} \right\rfloor \right\rfloor$$

where:
   $N_{subcarrier\ per\ chunk}$ = a number of subcarriers per data chunk; and
   $N_{symbols\ per\ TTI\ per\ subcarrier}$ = a number of symbols per Transmission Time Interval (TTI) per subcarrier.

10. The method according to claim 9, wherein, when $N_T$ is greater than number of symbol per TTI on a single carrier, then adaptive pilot symbols is not required to be inserted.

11. The method according to claim 1, and further including the step of:
   generating pilot symbol information identifying the location of the adaptive pilot symbols in the data chunk to enable the user equipment to use the adaptive pilot symbols for channel estimation.

12. The method according to claim 11, wherein the pilot symbol information is encoded to reduce the number of bits transmitted to the user equipment.

13. The method according to claim 12, wherein the pilot symbol information is self-decodable by the user equipment.

14. The method according to claim 11, wherein the pilot symbol information is transmitted prior to transmission of the pilot symbols and data chunks to enable detection of the adaptive pilot symbols by the user equipment.

15. The method according to claim 1, wherein the data chunks are transmitted from the base station to the user equipment using Orthogonal Frequency Division Multiplexing.

16. The method according to claim 1, wherein the spread spectrum communication system conforms to LTE/Super 3G systems standards developed by the $3^{rd}$ Generation Partnership Project (3GPP).

* * * * *